Figure 1:
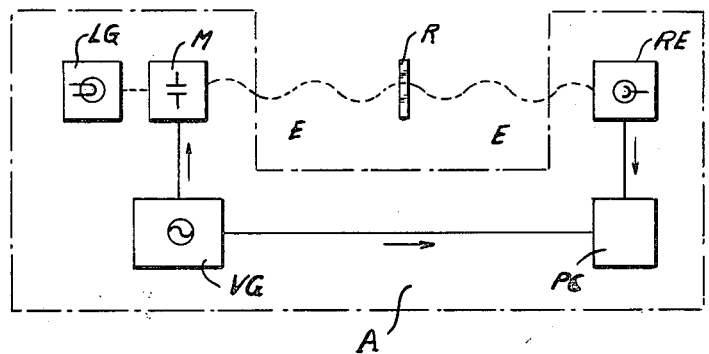

Feb. 6, 1962 K. HILDEBRAND ETAL 3,019,690
INSTRUMENT FOR MEASURING DISTANCES AND THE LIKE
Filed May 14, 1959 2 Sheets-Sheet 1

INVENTORS.
Klaus Hildebrand
and Hugo Pocher
By: Samuel W. Kipnis
Atty.

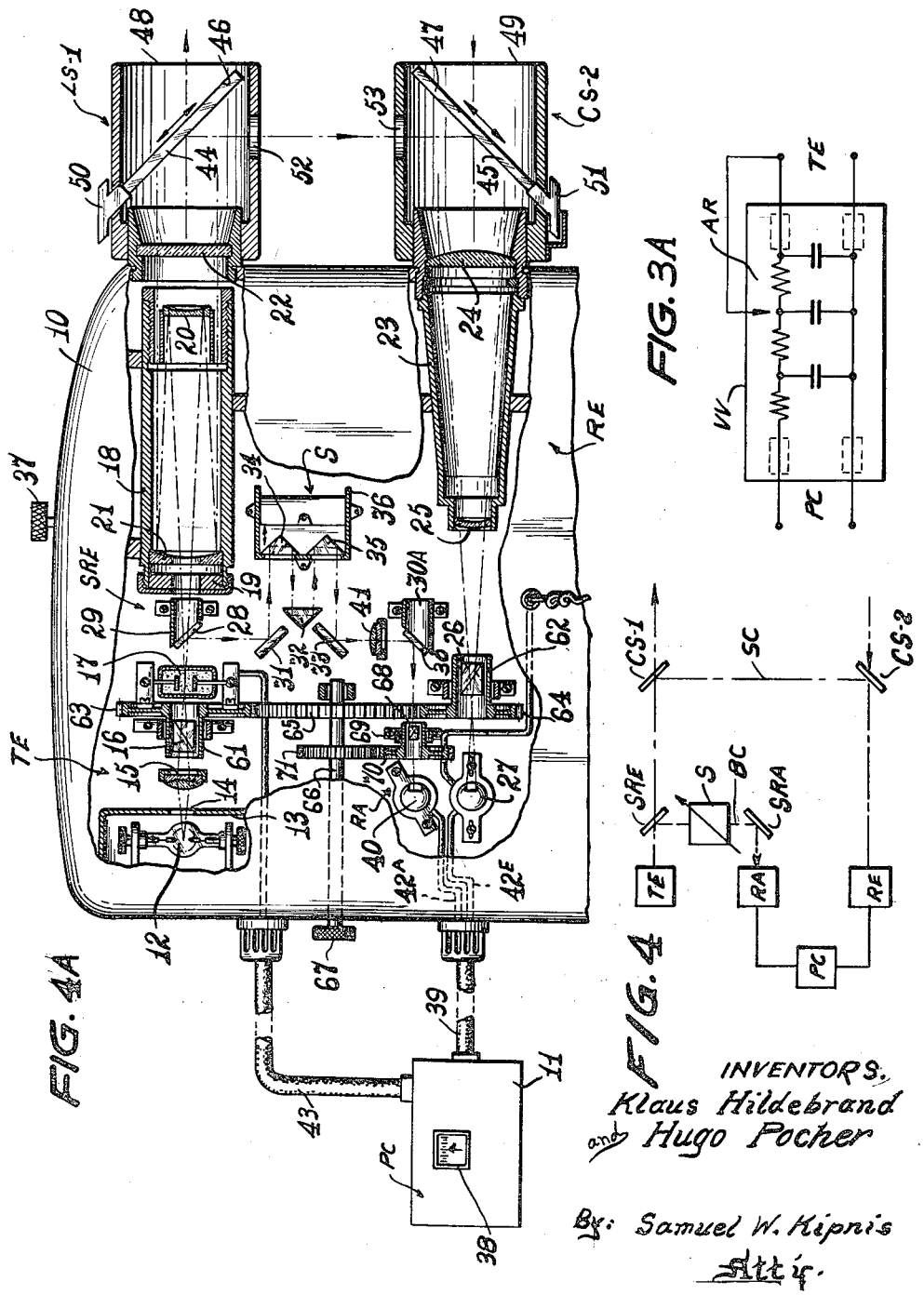

United States Patent Office 3,019,690
Patented Feb. 6, 1962

3,019,690
INSTRUMENT FOR MEASURING DISTANCES AND THE LIKE
Klaus Hildebrand, Berlin-Neukoelln, and Hugo Pocher, Berlin-Friedenau, Germany, assignors to Continental Elektroindustrie A.G., Askania-Werke, Berlin-Mariendorf, Germany, a corporation of Germany
Filed May 14, 1959, Ser. No. 813,224
Claims priority, application Germany Mar. 10, 1956
3 Claims. (Cl. 88—1)

This invention relates to an instrument for measuring distances and the like by emitting, reflecting and receiving signals of light wave genery and by analyzing phase characteristics of such signals.

It has been usual in instruments of this kind to emit a cyclically modulated light signal, for instance by means of a polarizer combined with a Kerr cell, a Faraday cell, or an ultrasonic cell or light valve. In each case cyclically modulated voltages are impressed upon the emitting cell, whereby light signals are correspondingly modulated, these modulations being subject to certain differences between the exact wave shapes of impressed voltage and emitted light signal, as is well known to the art. The light signal is remotely reflected and caused to return to the instrument, where it excites a photocell or the like. This cell correspondingly generates or modifies a voltage, again subject to detail distinctions between wave shapes of received light signal and resulting voltage signal. It has further been usual to utilize known phase comparing circuits for comparing voltage wave shapes impressed on the transmitter, with voltage wave shapes obtained in the receiver.

Although the instruments mentioned have reached a relatively high degree of efficiency, definite improvement has remained possible, and has been desired for some time, with respect to their accuracy and reliability. In this connection it has been determined that, while elsewhere in the field of instrumentation, electronic components are usually considered as providing a standard of precision, they constitute a source of error in the field of photoelectric instruments, considered herein. It has now been found that, by added utilization of light, errors caused by electronic components can be corrected and/or eliminated, and such is the basic object of this invention.

A first, particular object is, by means of an added light circuit, short-circuiting that which includes the remote reflector, to provide for easy and accurate calibration and recalibration of the instrument.

It has further been realized that, for purposes of measuring distances and the like, the above-mentioned direct comparison of voltages is far from being the most adequate method, and that improved measurements are provided by a system which compares the receiver voltage not with the voltage impressed upon the emitter but with a voltage generated in an auxiliary light receiver, in a short-circuiting light circuit. It is therefore an object of the invention to provide such a system.

The problems hitherto encountered, and which have been solved by this invention, are largely due to the fact that the aforementioned differences between wave shapes of impressed and resulting signals are far from being the same in the transmitter as in the receiver. Moreover they are far from being uniform throughout the operation of the instrument, being on the contrary much dependent on operating conditions, such as the prevailing temperatures.

It is a further, important object of this invention to provide an electro-optical instrument which allows phase comparison of emitted and received optical signals with enhanced precision, thereby allowing improved measurements of distances and the like. Such improvement has actually been achieved. The transmitter cell and the phase comparison circuit have been connected electro-optically, rather than by means of the purely electrical connection hitherto employed, and the precision of the instrument has been enhanced thereby. Advantageously the instrument includes an optical or equivalent phase shifting element, thereby facilitating required calibrations and the like. This as well as other objects will appear more clearly from the description which follows.

Figure 2:
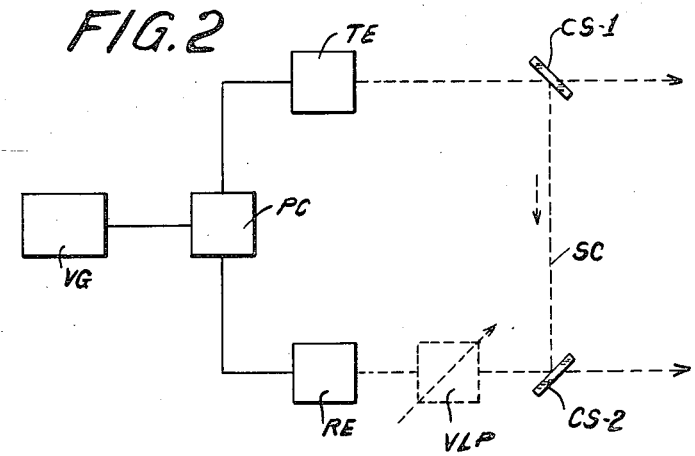
Figure 3:
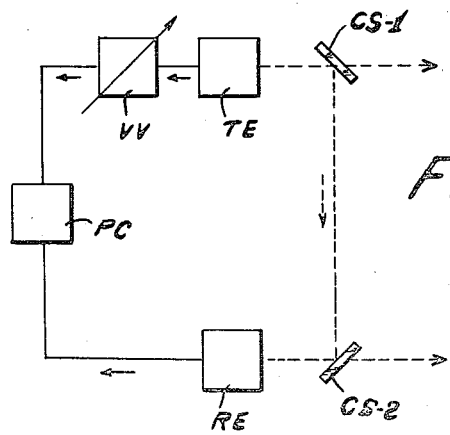

In the drawing FIGURE 1 is a block diagram of a basically known system as contemplated herein, with schematic indication of fundamental, functional elements or subcombinations important for the understanding of the invention. FIGURES 2 to 4 are block diagrams of instruments according to the invention. FIGURE 3A is a partial, schematic circuit diagram, showing a circuit branch which can be used in the instrument of FIGURE 3. FIGURE 4A is a side elevation, partly broken away and shown in vertical section, of a preferred form of the new instrument of FIGURE 4.

Referring first to FIGURE 1: the system and instrument A comprises a light generator or source LG, it being understood that when light is mentioned hereinafter, it is possible according to know principles and with minor modifications to use either visible light, ultra-violet light or infra-red light. Correspondingly the terms relating to light and to optical means and processes, which will be used hereinafter, must be understood in a broad sense. A modulator M for the light is provided; it may comprise for instance a Nicols prism suitably combined with a Kerr cell or with a device for utilization of the Faraday effect, or various similar means, effecting modulation for instance of the intensity of the emitted light and thus producing a cyclic signal. In the diagram it is assumed that the modulation is sinusoidal; the so-modulated signal is indicated by the wavy, broken line. It traverses, as will be assumed, a distance E to be measured, at the end of which it is reflected by a remote reflector R, whereupon it traverses the distance E again and is received by a receiver element RE in measuring instrument A. Diagrammatically, and to avoid the necessity of showing minute details, the reflected wave is shown past the reflector rather than superposing or partly superposing it on the incident wave.

In the receiver RE a photo cell such as a secondary electron multiplier is used for receiving and demodulating the measuring signal, thereby producing an electrical signal. A phase comparator circuit PC has hitherto been used to directly compare this electrical receiver signal with a transmitter signal such as a voltage impressed on the Kerr cell by an oscillator or voltage generator VG. All parts mentioned, except the remote reflector R, form a unitary instrument A, as suggested by the broken line surrounding these parts.

The function of the system involves a utilization of the finite time which the electromagnetic wave or lightwave requires to traverse and retraverse distance E between transmitter LGM and receiver RE, via reflector R, for measuring the distance E from the transmitter-receiver A to the reflector R. Incident to the modulation produced at M, there occurs a measurable phase shift (this term, of course, referring to the modulation cycle, the relatively infinite angular phase shift or delay at the wavelength of the light itself being irrelevant to the operation) between emitted and received signals, which phase shift, by suitable computation and/or calibration, allows direct determination of the traversed distance E. However, accurate determination of this distance presupposes the absence of any phase shift occasioned within the instrument itself; the presence of an instrument-conditioned phase shift obviously causes a spurious measuring indication.

In order to counteract such spurious influence it is basically necessary, of course, to calibrate such an instrument and thus to eliminate additive and measurement-affecting influences such as those inherent in the use of indispensable capacitor elements and the like in circuit PC or elsewhere. Next, it is obviously necessary to eliminate spurious phase shifts caused by the Kerr or photo cells and related elements of transmitters and receivers. Such spurious phase shifts are especially likely in the photocells or electron multipliers of receivers RE. The electron velocity and discharge time of such devices is much dependent mainly on the supply potential; and it has therefore been attempted for a long time so to stabilize such potential as to eliminate the spurious influence. Such stabilization, however, is enormously costly. Moreover, other elements are also subject to error, under variable operating conditions, such as are unavoidable in instruments of the present type; and the attempt to stabilize all elements has caused very considerable expense and complication, while remaining far from producing an instrument that was reliable and accurate under fluctuating conditions. Practically it was necessary, up to now, to re-calibrate transmitter-receiver units of the present type on frequent occasions, by test measurements utilizing known distances, that is, distances accurately measured by other methods. Obviously, a distance meter dependent on other distance meters was not very satisfactory.

The device schematically shown in FIGURE 2 provides what may be called a built-in recalibrating distance. In other words, as shown in this figure, there is provided between the transmitter TE (containing elements LG and M of FIGURE 1) and the receiver RE a short-circuiting light path SC, including a variable light path element VLP. This element VLP is permanently installed in the instrument, together with mirrors CS-1, CS-2 for deflecting and short-circuiting light from transmitter TE via VLP to the receiver RE. Normal distance measurements are carried out without the mirrors CS-1, CS-2 inserted, as suggested by broken lines extending beyond these mirrors; and a phase comparison is made by circuit PC. For recalibration, the mirrors CS-1, CS-2 are inserted, as by a lever mechanism, not shown; and the length of the short-circuiting light path SC is used as the calibration point. This length is known, the elements TE, CS-1, 2, RE being rigidly mounted. Thus it may be determined whether the instrument itself has caused a spurious measurement of this known distance. As soon as this is known, normal measurements, with the mirrors withdrawn, can be recomputed and corrected accordingly.

It is further possible to eliminate the need for any bothersome recomputation by providing a phase shifter element, for instance an adjustable or variable light path VLP, whereby the electrical indication from circuit PC can be corrected to produce a desired indication of the correct length of light path SC, instead of any spurious length. By means of such adjustment, which requires no further computation, a promptly performed actual distance measurement, over distances such as E in FIGURE 1, is also corrected, that is, the measurement is no longer affected by the instrument-conditioned phase shifts. For many purposes, the recalibrating or short-circuiting light path SC can be of negligible length, that is, the distance between mirrors CS-1, 2 can be minute in comparison with the distance E to be measured.

In operation, an original calibration is performed, at a predetermined frequency of oscillator VG in transmitter-receiver TE, RE; it yields some output indication of circuit PC, corresponding to short path SC. Assuming now that some element for instance in RE develops spurious tendencies, these can be corrected by re-calibrating the instrument, at the said predetermined frequency, with the aid of optical phase shifter VLP, which can be used to return the instrument to correct reading. Thereupon, a measurement of distance E can be performed with high precision.

In FIGURE 3 a similar system is shown, wherein, however, a voltage variator or electronic phase shifter VV is provided instead of the optical phase shifter VLP of FIGURE 2. Electronic phase shifters, as well as their component series inductors, parallel capacitors, etc. are well known and need not be described in detail; however, schematically, a circuit of such a device is shown in FIGURE 3A, wherein the adjustable element is shown in form of rheostat AR.

The preferred manner in which the above-explained principles can be employed, according to this invention, is schematically shown in FIGURE 4. The system of this figure avoids the drawback of the system of FIGURE 2, that is, the intensity reduction caused by light path elements CS-1, 2, VLP; and at the same time it also avoids the drawback of the system of FIGURE 3, that is, the fact that frequency-insensitive phase shifting by an electronic circuit VV is possible only within a limited band and that the scope of application of the instrument is limited accordingly. Yet the system of FIGURE 4 provides the important advantage of both FIGURES 2 and 3, that is, the feature that recalibration is instantly possible, without tedious computations. In fact it provides still other advantages, as will now be explained.

Referring to FIGURE 4, the preferred instrument comprises transmitter element TE for generating and transmitting a cyclically modulated optical signal, such signal being schematically indicated by the broken line and arrow pointing toward the right. It will be understood that the signal generally traverses a considerable distance, at the end of which it is reflected by a remote reflector, whereupon it retraverses the same distance as shown by the broken line and arrow pointing toward left. The signal is then received in receiver element RE.

In accordance with the invention the elements TE and RE are not electrically interconnected for phase comparison, as has been usual in this art; they are, instead, connected with the aid of an auxiliary photoelectrical receiver RA, which is interposed on a bypassing light circuit or path BC, advantageously passing through a phase-shifting element S such as a light loop of variable length. An electronic phase comparator PC is provided, which as indicated is in circuit with the two receivers RE, RA. The bypass light signal is produced and guided to RA by a pair of reflector elements, including a first reflector or semi-reflector SRE obliquely interposed on the light path from the transmitter TE, and a second reflector SRA similarly interposed in front of auxiliary receiver RA, with phase-shifting light loop S between these semi-reflectors.

For purposes of calibration and the like, the instrument is desirably also provided with a second short circuit or bypass path SC of light, produced by calibrating semi-reflectors CS-1, CS-2 obliquely interposed, respectively, on the paths of the transmitted and returning light signals, beyond the elements SRE and RE.

In the normal operation of the system of FIGURE 4, as well as during calibrating operations, reflectors SRE and SRA are inserted, while the second pair of semi-reflectors CS-1, CS-2 are inserted only for calibration purposes. It will further be understood that during the performance of the distance measurement of the light, the instrument is directed toward the remote reflector, whereas the transmission of light toward such reflector, or the return of light therefrom, is prevented during a calibration operation.

The construction of the new instrument will be understood more completely on consideration of FIGURE 4A, wherein the transmitter-receiver unit of FIGURE 4 is shown as being enclosed in a housing 10, suitably connected with chassis 11 for the electronic phase comparator PC and associated devices. Transmitter TE is shown as comprising a source of intense, advantageously monochromatic, light, such as mercury arc lamp 12 contained in housing 13 with light aperture 14. Optical system 15 focuses light from this lamp and aperture, across polarizer 16, into Kerr cell 17. Thereafter the light enters an objective system 18, directing the light toward the remote reflector. Objective system 18 is shown as utilizing an inverted cassegrainian telescope, receiving a divergent light beam from Kerr cell 17 through an aperture 19 of the type otherwise used for the mounting of an ocular, this light beam then traveling via intercepting reflector 20 to principal reflector 21, whereby it is collimated, so that it leaves objective aperture 22 as a bundle of parallel rays.

Receiver element RE includes a refracting telescope 23, having objective and ocular lenses 24, 25, which direct the returning light across polarization analyzer 26 onto the principal receiver photocell 27, which advantageously consists of a secondary electron multiplier.

Semi-reflector SRE, positioned between Kerr cell 17 and transmitter telescope 18, advantageously comprises a highly transparent glass palte 28, obliquely interposed on the common axis of optical system 15 and telescope 18 and rigidly held in a holder 29. The inherent reflecting power, possessed even by highly transparent glass, causes a small amount of light to be branched off from the signal generated at 12 and modulated at 17, such light being guided thereafter through phase shift element S to a full reflector SRA, provided by mirror plate 30 obliquely disposed in front of auxiliary receiver system RA; this plate being rigidly held in holder 30A. The phase shifting light loop element S comprises a system of rigidly mounted reflector plates 31, 32, 33 opposite a system of reflector prisms 34, 35 mounted in shiftable housing 36, the distance of said housing from systems 31, 32, 33 being variable by control knob 37 through the intermediary of suitable linkage not shown.

While the above described elements 12 to 37 are installed in or on housing 10, the associated cabinet 11 contains the phase comparator PC, which is believed to be sufficiently well known to require no detailed description herein. Suffice it to say that the phase comparator circuit includes an adjustable voltage or frequency generator VG (FIGURE 1), combined with power source means, as well as a phase comparison indicator 38. Cable 39 is provided for connecting phase indicator unit PC with principal receiving photocell 27 (system RE) and with auxiliary photocell 40 (system RA). An optical system 41 is desirably interposed between reflectors 33 and 30, forming part of the light path to the auxiliary photocell. That cell and the principal photocell 27 are electrically connected with circuit PC by conductor systems 42A, 42E respectively. Suitable connection is also made, by cable 43, between the power source in housing 11 and the Kerr cell 17, for proper cyclic actuation of said cell. It will be understood that by means of the circuitry including cables 42A and 42E, voltages of cells 27 and 40 are compared, for instance by impressing both on screen grids of amplifier tubes in a suitable bridge circuit in unit 11.

Calibrating semi-reflectors CS–1, CS–2 are shown in form of glass plates 44, 45 respectively, which are removably held in suitable grooves 46, 47, formed in housings 48, 49 attached to the objective ends of transmitting and receiving telescopes 18, 23. For measuring purposes, as already mentioned, these semi-reflectors are desirably removed, by means of handles 50, 51, whereas they are inserted for calibrating purposes, at which time they establish constant light path SC, through suitable apertures 52, 53 in the housing attachments. It is possible to provide added length of this bypass light path, by interposing further reflectors thereon, as need not be described herein.

The measuring operation, performed with the system of FIGURES 4, 4A, involves, as already indicated, transmitting light from source 12 through Kerr cell 17 to the remote reflector and returning it therefrom through analyzer 26 to photocell 27. While heretofore attempts were made to compare the cyclic phase of a Kerr cell or the like with the cyclic phase of such a photocell, the present invention uses instead the bypass system BC, RA, which on the one hand furnishes a comparing wave shape of much improved form, through cable 42A, while on the other hand avoiding any significant weakening of the remotely transmitted light signal, as the amount of light branched off at 29 is almost infinitesimally small. The minute amount of bypassed light is nevertheless usable to provide a clearly analyzable comparison cycle, in and by auxiliary photocell 40.

Ideally, the auxiliary receiver or photocell 40 would have zero distance from and phase difference from the transmitting Kerr cell 17. This is evidently impossible; however, in terms of distances E (FIGURE 1) the distance 17 to 40 is negligible.

The new system greatly adds to the precision of an instrument of the present kind by allowing phase comparison of transmitted and received signals having identical wave shape. At the same time, the new system can readily be constructed so as to avoid optical disturbances and the like. For instance, it is preferred to mount polarizer 16 and analyzer 26 in tiltably adjustable mountings 61, 62 respectively and to provide for controlled tilting thereof, by gears 63, 64, 65. These gears are in mesh with one another and are jointly rotatable by shaft 66, which in turn is rotated by knob 67. This arrangement serves to minimize errors, potentially caused by stray polarized background light. For this purpose, the user can establish such orientation of analyzer 26 as shields such stray light from cell 27. A corresponding, simultaneous adjustment is provided for polarizer 16 and associated Kerr cell 17, by the gear system, as is known from the co-pending application Serial No. 623,571, filed by one of the present inventors, now U.S. Patent No. 2,909,958. Additionally, and in further accordance with the present invention, auxiliary receiver system RA comprises a small rotatable analyzer 68, interposed between reflector 30 and photocell 40, in order to assure the same cycle of light pulses on primary and secondary photocells 27, 40 subject only to the phase difference caused by the remote reflection of the light signal. Analyzer 68 is accordingly rotated, with housing 69, by gear 70 which is driven by a further gear 71 secured to the aforementioned shaft 66, so as to reorient the analyzers 68 and 26 in uniform fashion.

This is a continuation-in-part of Serial No. 645,110, filed by the present inventors on March 11, 1957, and now abandoned.

We claim:

1. An electro-optical device for measurement of distances of objects having a modulated light source, means for transmitting a light beam from the source to an object under measurement, a first light transducer, means for directing light reflected from the object to said first transducer, a second light transducer, means for directing light from the source to the second light transducer over an optical path independent of such reflection and containing a variable optical phase-shifter, means for comparing the phase of the signals produced by the two transducers, and selectively operable calibrating means comprising a fixed-length short-circuit light path from the source to the first transducer, whereby the device may be recalibrated by varying the phase-shifter delay using the fixed path as a standard, and the transmitted and reflected light paths are unattenuated by the optical phase-shifter.

2. An electro-optical device for measurement of the transmission of light over an exterior reflection path under measurement comprising a source of modulated light, means for transmitting light from the source over the reflection path under measurement, a receiving light-responsive transducer responsive to the reflected modulated light, a second light-responsive transducer, means including a variable optical phase-shifter for defining an optical path for transmission of light from the source to the second transducer, means for comparing the phase of the transducer outputs, and selectively operable calibration means forming a fixed-length short-circuit light path from the source to the first transducer.

3. An optical device for measurement of the transmission time of light over a path under measurement comprising a modulated light source, means for directing light from the source over the path under measurement, means for directing light from the source over a second path including an optical phase-shifter, means for receiving light over both paths and comparing their phase, and selectively operable calibration means including a third light path of fixed length short-circuiting the path under measurement, the common portions of the light path under measurement and the short-circuited path being of fixed length.

References Cited in the file of this patent

UNITED STATES PATENTS

| | | |
|---|---|---|
| 2,805,347 | Haynes et al. | Sept. 3, 1957 |
| 2,912,593 | Deuth | Nov. 10, 1959 |
| 2,966,090 | Scholdstrom | Dec. 27, 1960 |
| 2,966,824 | Granqvist | Jan. 3, 1961 |

OTHER REFERENCES

"A Check Determination of the Velocity of Light," Bergstrand, Arkiv for Fysik, Bd. 3, No. 26, September 1951, pages 479–490.

"Surveying With the Velocity of Light," Compton, Surveying and Mapping, July-September 1954, vol. XIV, No. 3, pages 283–292.